(12) United States Patent
Gao et al.

(10) Patent No.: US 11,816,031 B2
(45) Date of Patent: Nov. 14, 2023

(54) METHOD AND APPARATUS FOR INGESTING DATA, DEVICE AND STORAGE MEDIUM

(71) Applicant: Apollo Intelligent Connectivity (Beijing) Technology Co., Ltd., Beijing (CN)

(72) Inventors: He Gao, Beijing (CN); Qian Lyu, Beijing (CN); Wei Dai, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 9 days.

(21) Appl. No.: 17/578,848

(22) Filed: Jan. 19, 2022

(65) Prior Publication Data

US 2022/0405203 A1 Dec. 22, 2022

(30) Foreign Application Priority Data

Jun. 16, 2021 (CN) .......................... 202110665732.2

(51) Int. Cl.
*G06F 12/00* (2006.01)
*G06F 12/0802* (2016.01)

(52) U.S. Cl.
CPC ................. *G06F 12/0802* (2013.01)

(58) Field of Classification Search
CPC ...... G06F 12/0802; G06F 9/445; G06F 16/16; G06F 16/17; G06F 16/184; G06F 3/065;
(Continued)

(56) References Cited

U.S. PATENT DOCUMENTS

| 10,091,297 B1 | 10/2018 | Zhao et al. |
| 2010/0318785 A1 | 12/2010 | Ozgit |

(Continued)

FOREIGN PATENT DOCUMENTS

| CN | 106250571 A | 12/2016 |
| CN | 106649788 A | 5/2017 |

(Continued)

OTHER PUBLICATIONS

European Patent Office, Extended European Search Report in Application No. 22152870.6, dated Jul. 1, 2022 (9 pages).

*Primary Examiner* — Shawn X Gu
(74) *Attorney, Agent, or Firm* — Ice Miller LLP

(57) ABSTRACT

The present disclosure provides a method and apparatus for ingesting data, a device, a storage medium and a program product, and particularly to the field of computer technology, the field of intelligent traffic, and the like. A specific implementation comprises: deploying a first data ingestion system at a first data source, the first data ingestion system comprising a first read plugin, a first transmission plugin and a first write plugin; reading data from the first data source through the first read plugin; writing the data into a first transmission buffer queue through the first transmission plugin; and acquiring the data from the first transmission buffer queue through the first write plugin and writing the data into a first storage component. The data ingestion system in the present disclosure is divided into a read part, a transmission part and a write part. Each part works by means of a plugin.

14 Claims, 7 Drawing Sheets

(58) Field of Classification Search
CPC . G06F 3/0683; G06F 11/1446; G06F 11/1471
See application file for complete search history.

(56) References Cited

U.S. PATENT DOCUMENTS

2014/0317149 A1  10/2014  Friedt et al.
2021/0111870 A1   4/2021  Cooper et al.
2021/0208905 A1*  7/2021  Jayanthi .............. G06F 9/44526

FOREIGN PATENT DOCUMENTS

| CN | 107276992 A | 10/2017 |
| CN | 107436924 A | 12/2017 |
| CN | 107590208 A | 1/2018 |
| CN | 110113257 A | 8/2019 |
| CN | 110472102 A | 11/2019 |
| CN | 110502540 A | 11/2019 |
| CN | 111026735 A | 4/2020 |
| CN | 111984729 A | 11/2020 |
| JP | 2004133587 A | 4/2004 |
| JP | 2006236097 A | 9/2006 |

* cited by examiner

| Task name | Data source read | Data source written | Transmission expression | Execution status | Operation |
|---|---|---|---|---|---|
| | HBASE | MYSQL | | Uninitiated | Delete Edit Initiate |
| | ORACLE | ELASTICSEARCH | | Uninitiated | Delete Edit Initiate |
| | ORACLE | ELASTICSEARCH | | Uninitiated | Delete Edit Initiate |
| | ORACLE | ELASTICSEARCH | | Uninitiated | Delete Edit Initiate |
| | ORACLE | MYSQL | | Uninitiated | Delete Edit Initiate |
| | MYSQL | ELASTICSEARCH | | Uninitiated | Delete Edit Initiate |

Fig. 9

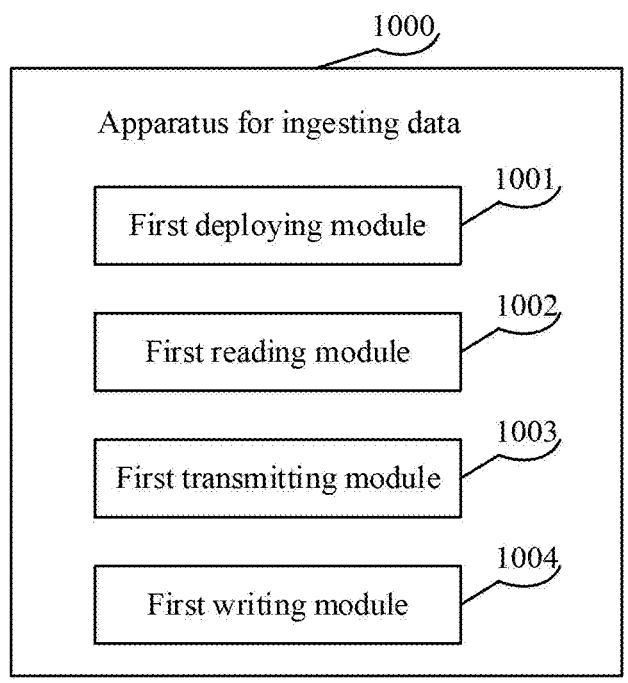

METHOD AND APPARATUS FOR INGESTING DATA, DEVICE AND STORAGE MEDIUM

CROSS-REFERENCE TO RELATED APPLICATIONS

This application claims priority to Chinese Patent Application No. 202110665732.2, filed with the China National Intellectual Property Administration (CNIPA) on Jun. 16, 2021, the contents of which are incorporated herein by reference in their entirety.

TECHNICAL FIELD

The present disclosure relates to the field of big data, and particularly to the field of data ingestion.

BACKGROUND

Big data ingestion technology is to ingest massive and multi-source heterogeneous data generated in real time and discrete in various business systems into a unified big data resource pool through certain technical means, for a big data analysis and calculation engine to perform an offline or real-time data analysis. In enterprises, institutions, governments and other departments, there is a large amount of data in various business lines of each department. Accordingly, it is required to ingest, integrate and mine data to extract and analyze valuable information to support decision-making.

SUMMARY

The present disclosure provides a method and apparatus for ingesting data, a device, a storage medium and a program product.

In a first aspect, embodiments of the present disclosure provide a method for ingesting data, comprising: deploying a first data ingestion system at a first data source, the first data ingestion system comprising a first read plugin, a first transmission plugin and a first write plugin; reading data from the first data source through the first read plugin; writing the data into a first transmission buffer queue through the first transmission plugin; and acquiring the data from the first transmission buffer queue through the first write plugin and writing the data into a first storage component.

In a second aspect, embodiments of the present disclosure provide an apparatus for ingesting data, comprising: a first deploying module, configured to deploy a first data ingestion system at a first data source, the first data ingestion system comprising a first read plugin, a first transmission plugin and a first write plugin; a first reading module, configured to read data from the first data source through the first read plugin; a first transmitting module, configured to write the data into a first transmission buffer queue through the first transmission plugin; and a first writing module, configured to acquire the data from the first transmission buffer queue through the first write plugin and write the data into a first storage component.

In a third aspect, embodiments of the present disclosure provide an electronic device, comprising: one or more processors; and a memory, storing one or more programs, wherein the one or more programs, when executed by the one or more processors, cause the one or more processors to implement the method provided by the first aspect.

In a forth aspect, embodiments of the present disclosure provide a computer-readable medium, storing a computer program thereon, wherein the program, when executed by a processor, causes the processor to implement the method provided by the first aspect.

In a fifth aspect, an embodiment of the present disclosure provides a computer program product, comprising a computer program, wherein the computer program, when executed by a processor, implements the method provided by the first aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure. Here:

FIG. 9 is a schematic diagram of a task initiation on a system page of the data ingestion system;

FIG. 10 is a schematic structural diagram of an embodiment of an apparatus for ingesting data according to the present disclosure.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
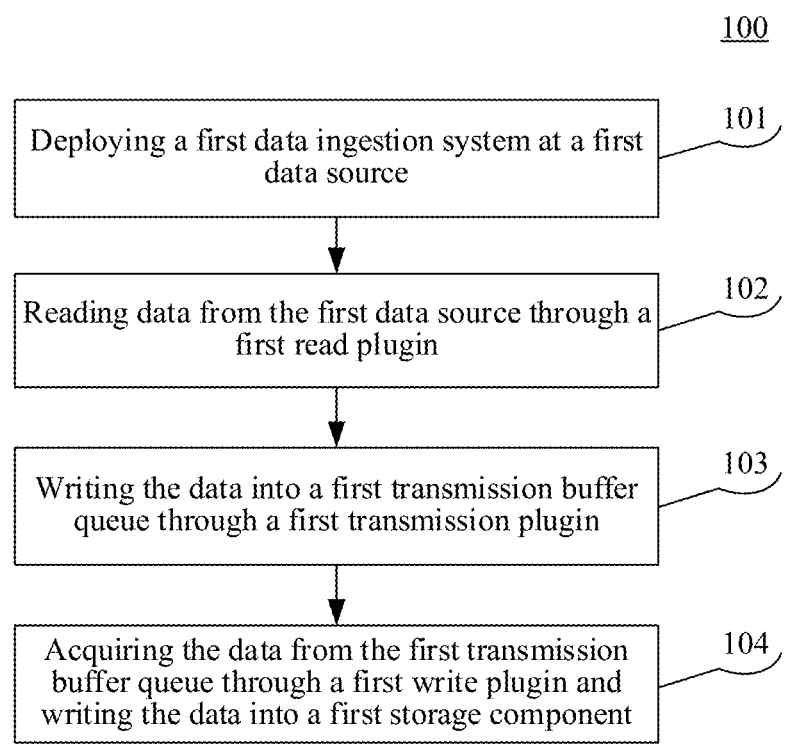
FIG. 1 is a flowchart of an embodiment of a method for ingesting data according to the present disclosure.

FIG. 1 illustrates a flow 100 of an embodiment of a method for ingesting data according to the present disclosure. The method for ingesting data includes the following steps:

Step 101, deploying a first data ingestion system at a first data source.

In this embodiment, an executing body of the method for ingesting data may deploy the first data ingestion system in the first data source.

Generally, the first data source may be a data source of any business system, and the number of data sources may be one or more. In each data source, one data ingestion system may be deployed. The data ingestion system may be divided into a read part, a transmission part, and a write part. Each part may work by means of a plugin, respectively a read plugin, a transmission plugin and a write plugin. Here, the read plugin may be used to read data from the data source. The write plugin may be used to write the data to a storage component. The data is buffered and transmitted between the read plugin and the write plugin through the transmission plugin. The transmission plugin may be used to transmit the data to a transmission buffer queue. The ingestion for the data may be accomplished by implementing the read plugin, the transmission plugin and the write plugin based on the storage component. When the first data source is a multi-source heterogeneous data source, the problem of multi-source heterogeneous data can be solved. For ease of explanation, the data ingestion system deployed in the first data source is referred to as a first data ingestion system. The read plugin, the transmission plugin and the write plugin that are included in the first data ingestion system are referred to as a first read plugin, a first transmission plugin and a first write plugin. The transmission buffer queue to which the first transmission plugin writes the data is referred to as a first transmission buffer queue. The storage component to which the first write plugin writes the data is referred to as a storage component.

Generally, different types of data sources correspond to different read plugins. Due to the limited types of the data source, the corresponding read plugins may be pre-written based on the data sources of the limited types. When it is required to read data from a data source, a corresponding read plugin may be selected from the pre-written read plugins according to the type of the data source. Here, the types of the data sources may include, but not limited to, a Mysql databases, an Oracle databases, an HDFS, a Kafka message queue, an FTP, a distributed file system, and the like.

Generally, different types of storage components correspond to different write plugins. Due to the limited types of the storage component, the corresponding write plugins may be pre-written based on the storage components of the limited types. When it is required to write data into a storage component, a corresponding write plugin may be selected from the pre-written write plugins according to the type of the storage component. Here, the types of the storage components may include, but not limited to, a Mysql databases, a Kafka message queue, a distributed file system, and the like.

The data ingestion system implements the read and write plugins for primary data sources, and implements the transmission plugin having buffering and persistence capabilities. Since the numbers of the read and write plugins in the data ingestion system are limited, the cost of the data ingestion is greatly reduced, and the efficiency of the data ingestion is greatly improved. Generally, for an already supported data transmission plugin, the ingestion for data only requires the ingestion of one data source that is completed within 2-3 minutes through a configuration. For a new data source type, it takes only 1 to 2 days to develop a read/write plugin.

Step 102, reading data from the first data source through a first read plugin.

In this embodiment, the above executing body may read the data from the first data source through the first read plugin.

Here, the first read plugin may be used to read the data from the first data source. The data of a business system tends to be constantly increased or modified with the businesses, and thus, during the actual data ingestion, there is a mode in which a full ingestion and an incremental modification are combined. Therefore, the first read plugin supports both reading full data from the first data source and reading incremental data from the first data source. In addition, the first read plugin further supports acquiring data from the first data source periodically or in real time. As a result, a plurality of modes such as an one-time full transmission, an incremental transmission, and a periodical transmission are realized, to be suitable for various data ingestion scenarios.

Step 103, writing the data into a first transmission buffer queue through a first transmission plugin.

In this embodiment, the above executing body may write the data into the first transmission buffer queue through the first transmission plugin.

Here, the data is buffered and transmitted through the first transmission plugin between the first read plugin and the first write plugin. The first transmission plugin may be used to transmit the data to the first transmission buffer queue.

Step 104, acquiring the data from the first transmission buffer queue through the first write plugin and writing the data into a first storage component.

In this embodiment, through the first write plugin, the above executing body may acquire the data from the first transmission buffer queue and write the data into the first storage component.

Here, the first write plugin may be used to write the data into the first storage component. The number of first storage components may be one or more. In the situation where the number of first data sources is more than one and the number of the storage components is one, the data of the first data sources can be ingested into the same storage component, thereby solving the problem of multi-source heterogeneous data.

The data ingestion system in the present disclosure is divided into the read part, the transmission part and the write part. Each part works by means of a plugin. Accordingly, the problem of the ingestion for multi-source heterogeneous data is solved.

Figure 2:
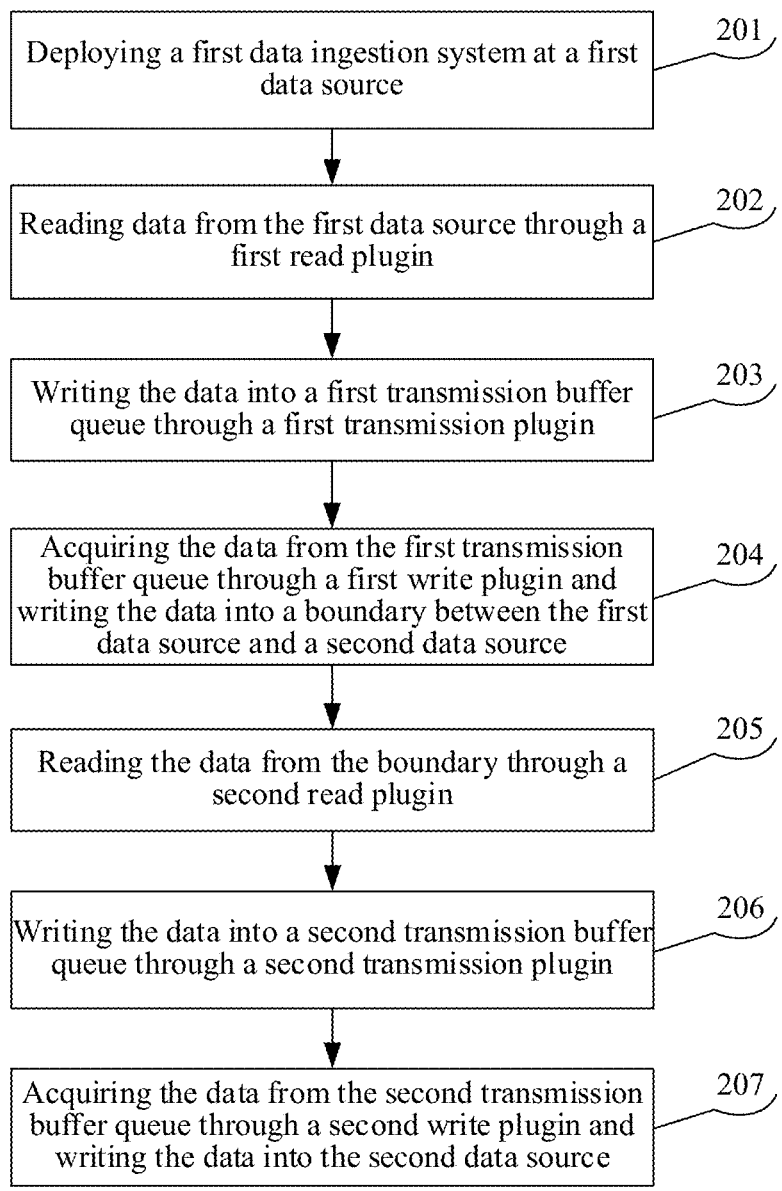
FIG. 2 is a flowchart of another embodiment of the method for ingesting data according to the present disclosure.

Further referring to FIG. 2, FIG. 2 illustrates a flow 200 of another embodiment of the method for ingesting data according to the present disclosure. The method for ingesting data includes the following steps:

Step 201, deploying a first data ingestion system at a first data source, and deploying a second data ingestion system at a second data source.

In this embodiment, an executing body of the method for ingesting data may deploy the first data ingestion system at the first data source, and deploy the second data ingestion system at the second data source.

Generally, different business systems belong to different enterprises or government departments. Because of network security, the data sources of the different business systems exist in different networks, and a direct communication cannot be implemented between the networks. A data transmission between the networks is implemented through a gap. Here, a medium (e.g., an FTP) supported by the gap is referred to as a boundary. Here, data ingestion systems are respectively deployed in different networks, such that the data ingestion systems are cascaded. On one side (e.g., the first data source) of a data ingestion, the data is written into the boundary through the write plugin, and on the other side (e.g., the second data source), the data is read from the boundary through the read plugin and written into a storage medium actually needed, and thus, the transmission across the networks can be implemented. When it is required to perform a transmission across a plurality of networks, it is only necessary to cascade the data ingestion systems among the networks.

It should be noted that deploying the second data ingestion system at the second data source is similar to deploying the first data ingestion system at the first data source, and thus will not be repeatedly described here. For ease of explanation, the data ingestion system deployed in the second data source is referred to as the second data ingestion system. The read plugin, the transmission plugin and the write plugin that are included in the second data ingestion system are referred to as a second read plugin, a second transmission plugin and a second write plugin. The transmission buffer queue to which the second transmission plugin writes the data is referred to as a second transmission buffer queue.

Step 202, reading data from the first data source through a first read plugin.

Step 203, writing the data into a first transmission buffer queue through a first transmission plugin.

Step 204, acquiring the data from the first transmission buffer queue through a first write plugin and writing the data into a boundary between the first data source and the second data source.

Here, a first storage component may be the boundary between the first data source and the second data source.

In this embodiment, the detailed operations of steps 202-204 are described in detail in steps 102-104 in the embodiment shown in FIG. 1, and thus will not be repeatedly described here.

205, reading the data from the boundary through a second read plugin.

In this embodiment, the above executing body may read the data from the boundary through the second read plugin.

Here, the second read plugin may be used to read the data from the boundary. It should be noted that reading the data by the second read plugin is similar to reading the data by the first read plugin, and thus will not be repeatedly described here.

Step 206, writing the data into a second transmission buffer queue through a second transmission plugin.

In this embodiment, the above executing body may write the data into the second transmission buffer queue through the second transmission plugin.

Here, the data is buffered and transmitted through the second transmission plugin between the second read plugin and the second write plugin. The second transmission plugin may be used to transmit the data to the second transmission buffer queue. It should be noted that transmitting the data by the second transmission plugin is similar to transmitting the data by the first transmission plugin, and thus will not be repeatedly described here.

Step 207, acquiring the data from the second transmission buffer queue through a second write plugin and writing the data into the second data source.

In this embodiment, through the second write plugin, the above executing body may acquire the data from the second transmission buffer queue and write the data into the second data source.

Here, the second write plugin may be used to write the data into the second data source. It should be noted that writing the data by the second write plugin is similar to writing the data by the first write plugin, and thus will not be repeatedly described here.

It can be seen from FIG. 2 that, as compared with the embodiment corresponding to FIG. 1, the method for ingesting data in this embodiment emphasizes the transmission across the networks. Thus, according to the solution described in this embodiment, the data ingestion systems are deployed in the different networks, such that the data ingestion systems are cascaded. On one side (e.g., the first data source) of the data ingestion, the data is written into the boundary through the write plugin, and on the other side (e.g., the second data source), the data is read from the boundary through the read plugin and written into the storage medium actually needed, and thus, the transmission across the networks can be implemented. When it is required to perform the transmission across the plurality of networks, it is only necessary to cascade the data ingestion systems among the networks.

Figures 3, 4:
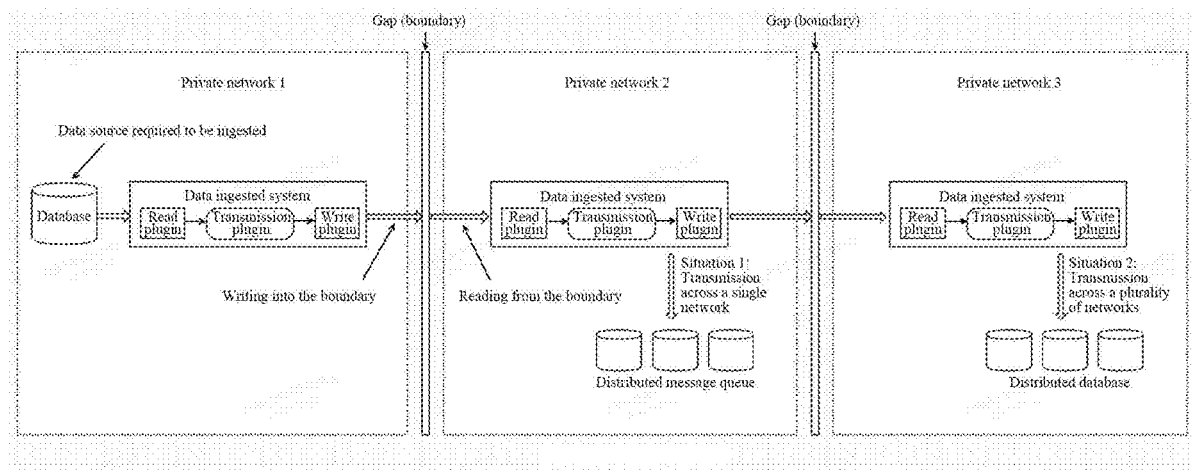
FIG. 3 is a diagram of a scenario in which the method for ingesting data in the embodiments of the present disclosure may be implemented.
FIG. 4 is a schematic diagram of a data source addition on a system page of a data ingestion system.

Further referring to FIG. 3, FIG. 3 is a diagram of a scenario in which the method for ingesting data in the embodiments of the present disclosure may be implemented. As shown in FIG. 3, data ingestion systems are respectively deployed in a private network 1, a private network 2 and a private network 3. Each data ingestion system includes a read plugin, a transmission plugin and a write plugin. For the private network 1, the read plugin in the data ingestion system first reads data from a database. Then, the transmission plugin in the data ingestion system performs data buffering and transmission between the read plugin and the write plugin. Finally, the write plugin in the data ingestion system writes the data into a gap (boundary) between the private network 1 and the private network 2. For the private network 2, the read plugin in the data ingestion system first reads the data from the gap between the private network 1 and the private network 2. Then, the transmission plugin in the data ingestion system performs data buffering and transmission between the read plugin and the write plugin. Finally, the write plugin in the data ingestion system writes the data into a distributed message queue or a gap between the private network 2 and the private network 3. Here, for the situation (situation 1) where the write plugin writes the data into the distributed message queue, the transmission across a single network can be implemented. For the situation (situation 2) where the write plugin writes the data into the gap between the private network 2 and the private network 3, it is required to continue to transmit the data to the private network 3. Specifically, for the private network 3, the read plugin in the data ingestion system first reads the data from the gap between the private network 2 and the private network 3. Then, the transmission plugin in the data ingestion system performs data buffering and transmission between the read plugin and the write plugin. Finally, the write plugin in the data ingestion system writes the data into a distributed database. Thus, the transmission across a plurality of networks can be implemented.

In some embodiments, the data ingestion system may further be provided with a system page. Through the system page, at least one of an initiation and a stop of a data ingestion task and a modification to a task execution time point may be controlled through the system page, thereby solving the problem that it is difficult to manage and maintain the data ingestion task.

An application scenario in which a data ingestion task is created by controlling data through a system page is provided below.

Step 1, a data source is added.

FIG. 4 is a schematic diagram of a data source addition on a system page of a data ingestion system. As shown in FIG. 4, a data source is added on the system page. During the data source addition, it is possible to select a data source type, fill in a data source name, a user name, a password, a data source address, and the like.

Step 2, a transmission task is configured.

Figure 5:
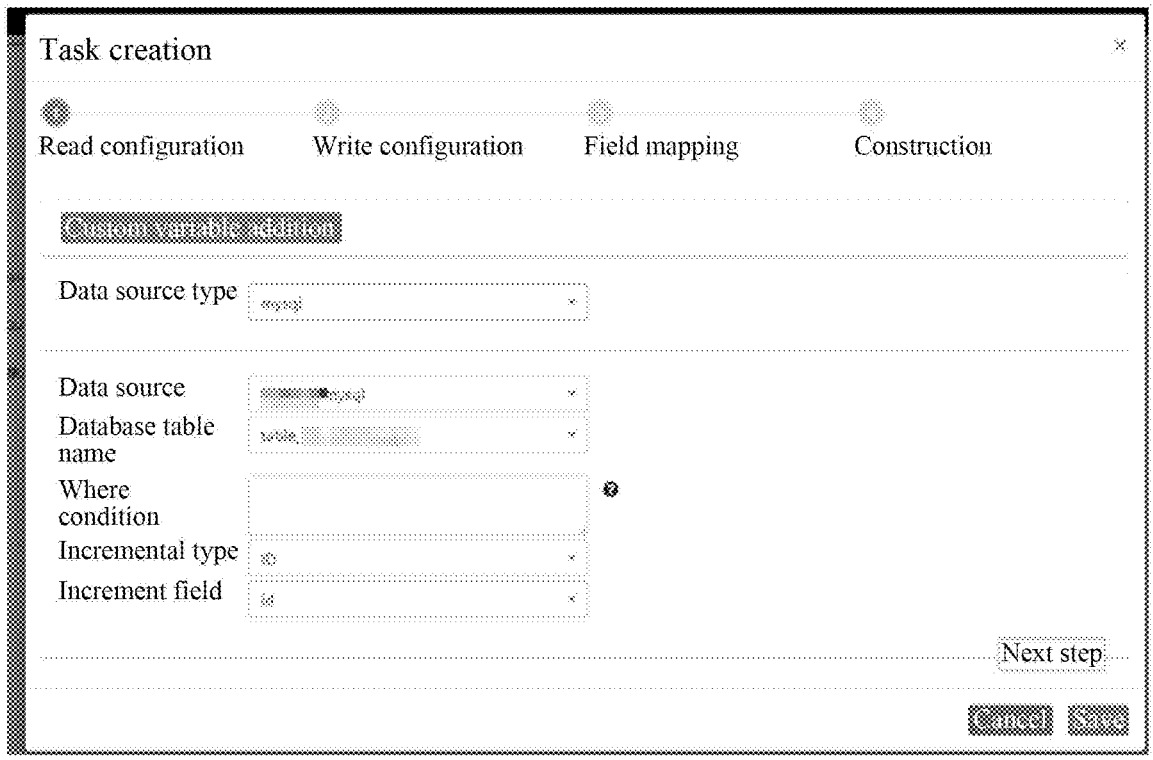
FIG. 5 is a schematic diagram of a read configuration on a system page of the data ingestion system.
Figure 6:
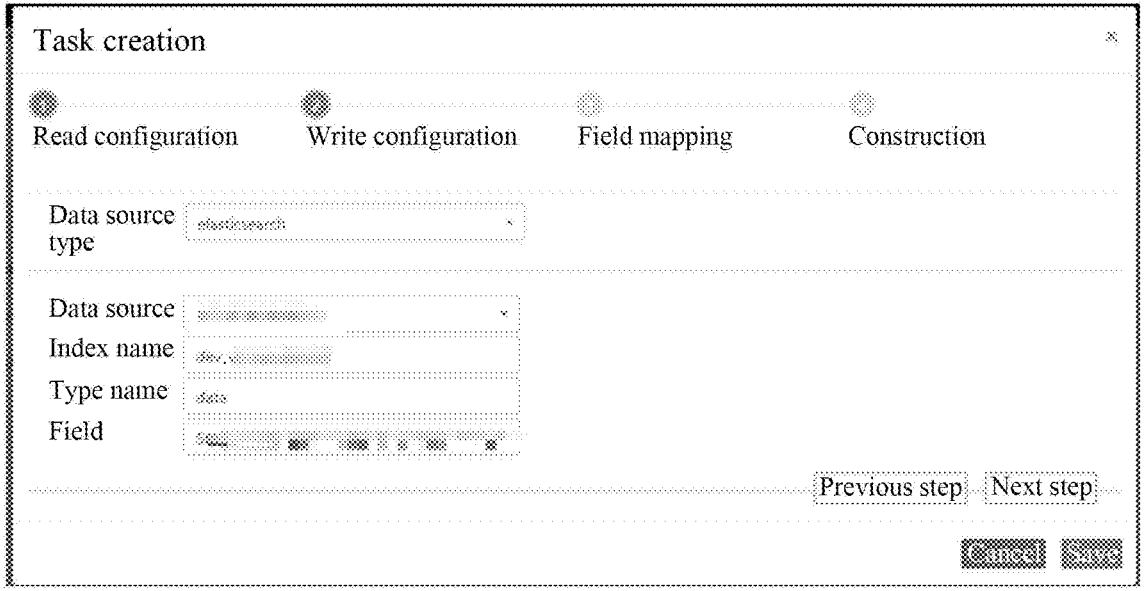
FIG. 6 is a schematic diagram of a write configuration on a system page of the data ingestion system.
Figure 7:
FIG. 7 is a schematic diagram of field mapping on a system page of the data ingestion system.
Figure 8:
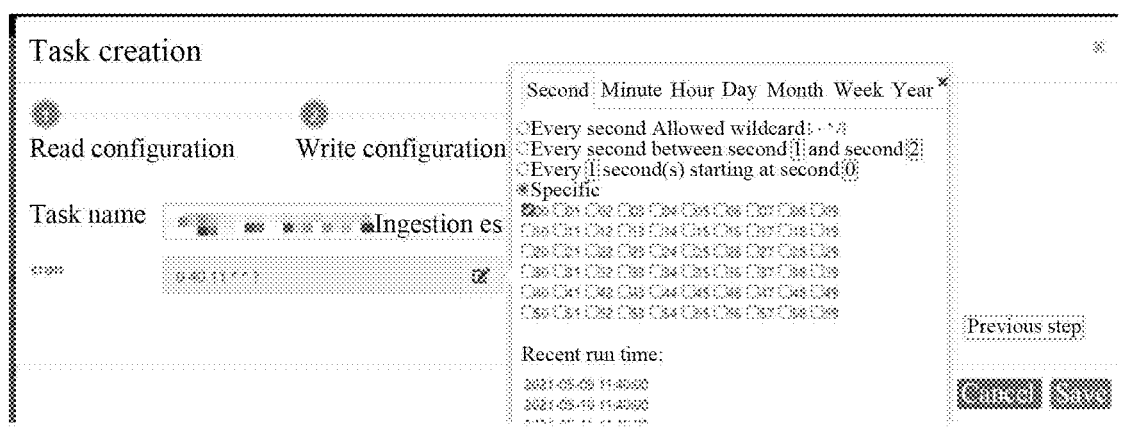
FIG. 8 is a schematic diagram of task building on a system page of the data ingestion system.

FIG. 5 is a schematic diagram of a read configuration on a system page of the data ingestion system. As shown in FIG. 5, a custom variable is added on the system page, the custom variable including a where condition, an incremental type, an increment field, and the like. FIG. 6 is a schematic diagram of a write configuration on a system page of the data ingestion system. As shown in FIG. 6, the write configuration on the system page includes a data source type, a data source, an index name, a type name, a field, and the like. FIG. 7 is a schematic diagram of field mapping on a system page of the data ingestion system. As shown in FIG. 7, the field mapping on the system page is to map a source field as a target field. FIG. 8 is a schematic diagram of task building on a system page of the data ingestion system. As shown in FIG. 8, on the system page, the task naming time is selected.

Step 3, the transmission task is initiated.

FIG. 9 is a schematic diagram of a task initiation on a system page of the data ingestion system. As shown in FIG. 9, different transmission tasks all correspond to a delete operation, an edit operation and an initiation operation. When a transmission task needs to be initiated, it is only required to perform the initiation operation on the transmission task.

Further referring to FIG. 10, as an implementation of the method shown in the above drawings, the present disclosure provides an embodiment of an apparatus for ingesting data. The embodiment of the apparatus corresponds to the embodiment of the method shown in FIG. 1. The apparatus may be applied in various electronic devices.

As shown in FIG. 10, the apparatus 1000 for ingesting data in this embodiment may include: a first deploying module 1001, a first reading module 1002, a first transmitting module 1003 and a first writing module 1004. Here, the first deploying module 1001 is configured to deploy a first data ingestion system at a first data source. The first data ingestion system includes a first read plugin, a first transmission plugin and a first write plugin. The first reading module 1002 is configured to read data from the first data source through the first read plugin. The first transmitting module 1003 is configured to write the data into a first transmission buffer queue through the first transmission plugin. The first writing module 1004 is configured to acquire the data from the first transmission buffer queue through the first write plugin and write the data into a first storage component.

In this embodiment, for specific processes of the first deploying module 1001, the first reading module 1002, the first transmitting module 1003 and the first writing module 1004 in the apparatus 1000 for ingesting data, and their technical effects, reference may be respectively made to relative descriptions of steps 101-104 in the corresponding embodiment of FIG. 1, which will not be repeatedly described here.

In some alternative implementations of this embodiment, the first storage component is a boundary between the first data source and a second data source. The apparatus 1000 for ingesting data further includes: a second deploying module, configured to deploy a second data ingestion system at the second data source, wherein the first data ingestion system and the second data ingestion system are cascaded, and the second data ingestion system includes a second read plugin, a second transmission plugin and a second write plugin; a second reading module, configured to read the data from the boundary through the second read plugin; a second transmitting module, configured to write the data into a second transmission buffer queue through the second transmission plugin; and a second writing module, configured to acquire the data from the second transmission buffer queue through the second write plugin and write the data into the second data source.

In some alternative implementations of this embodiment, the first reading module 1002 is further configured to: read full data or incremental data from the first data source periodically or in real time.

In some alternative implementations of this embodiment, different types of data sources correspond to different read plugins, and different types of storage components correspond to different write plugins.

In some alternative implementations of this embodiment, a data ingestion system is provided with a system page, and at least one of an initiation and a stop of a data ingestion task and a modification to a task execution time point is controlled through the system page.

The acquisition, storage, application, etc. of the personal information of a user that are involved in the technical solution in the present disclosure are all comply with the provisions of the relevant laws and regulations, and do not violate the public order and good customs.

According to an embodiment of the present disclosure, the present disclosure further provides an electronic device, a readable storage medium and a computer program product.

Figure 11:
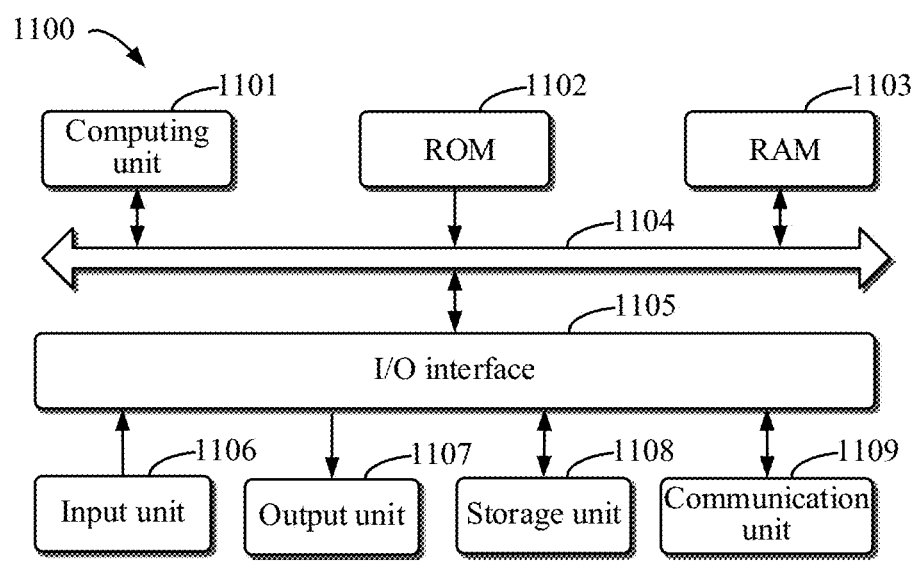
FIG. 11 is a block diagram of an electronic device used to implement the method for ingesting data in the embodiments of the present disclosure.

FIG. 11 is a schematic block diagram of an exemplary electronic device that may be used to implement the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 11, the device 1100 includes a computation unit 1101, which may execute various appropriate actions and processes in accordance with a computer program stored in a read-only memory (ROM) 1102 or a computer program loaded into a random access memory (RAM) 1103 from a storage unit 1108. The RAM 1103 also stores various programs and data required by operations of the device 1100. The computation unit 1101, the ROM 1102 and the RAM 1103 are connected to each other through a bus 1104. An input/output (110) interface 1105 is also connected to the bus 1104.

The following components in the device 1100 are connected to the I/O interface 1105: an input unit 1106, for example, a keyboard and a mouse; an output unit 1107, for example, various types of displays and a speaker; a storage device 1108, for example, a magnetic disk and an optical disk; and a communication unit 1109, for example, a network card, a modem, a wireless communication transceiver. The communication unit 1109 allows the device 1100 to exchange information/data with an other device through a computer network such as the Internet and/or various telecommunication networks.

The computation unit 1101 may be various general-purpose and/or special-purpose processing assemblies having processing and computing capabilities. Some examples of the computation unit 1101 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computation unit 1101 performs the various methods and processes described above, for example, the method for ingesting data based on a cloud service. For example, in some embodiments, the method for ingesting data based on a cloud service may be implemented as a computer software program, which is tangibly included in a machine readable medium, for example, the storage device 1108. In some embodiments, part or all of the computer program may be loaded into and/or installed on the device 1100 via the ROM 1102 and/or the communication unit 1109. When the computer program is loaded into the RAM 1103 and executed by the computation unit 1101, one or more steps of the above method for ingesting data based on a cloud service may be performed. Alternatively, in other embodiments, the computation unit 1101 may be configured to perform the method for ingesting data based on a cloud service through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, a distributed system server, or a server combined with a blockchain.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for ingesting data, comprising:
   deploying a first data ingestion system at a first data source, the first data ingestion system comprising a first read plugin, a first transmission plugin and a first write plugin;
   reading data from the first data source through the first read plugin;
   writing the data into a first transmission buffer queue through the first transmission plugin; and
   acquiring the data from the first transmission buffer queue through the first write plugin and writing the data into a first storage component; wherein the first storage component is a boundary between the first data source and a second data source;
   deploying a second data ingestion system at the second data source, wherein the first data ingestion system and the second data ingestion system are cascaded, and the second data ingestion system comprises a second read plugin, a second transmission plugin and a second write plugin;
   reading the data from the boundary through the second read plugin;
   writing the data into a second transmission buffer queue through the second transmission plugin; and
   acquiring the data from the second transmission buffer queue through the second write plugin and writing the data into the second data source.

2. The method according to claim 1, wherein the reading data from the first data source through the first read plugin comprises:
   reading full data or incremental data from the first data source periodically or in real time.

3. The method according to claim 2, wherein different types of data sources correspond to different read plugins, and different types of storage components correspond to different write plugins.

4. The method according to claim 2, wherein a data ingestion system is provided with a system page, and at least one of an initiation and a stop of a data ingestion task and a modification to a task execution time point is controlled through the system page.

5. The method according to claim 1, wherein different types of data sources correspond to different read plugins, and different types of storage components correspond to different write plugins.

6. The method according to claim 1, wherein a data ingestion system is provided with a system page, and at least one of an initiation and a stop of a data ingestion task and a modification to a task execution time point is controlled through the system page.

7. An electronic device, comprising:
   at least one processor; and
   a storage device, communicated with the at least one processor,
   wherein the storage device stores an instruction executable by the at least one processor, and the instruction is executed by the at least one processor, to enable the at least one processor to perform operations for ingesting data, the operations comprising:
   deploying a first data ingestion system at a first data source, the first data ingestion system comprising a first read plugin, a first transmission plugin and a first write plugin;
   reading data from the first data source through the first read plugin;
   writing the data into a first transmission buffer queue through the first transmission plugin; and
   acquiring the data from the first transmission buffer queue through the first write plugin and writing the data into a first storage component; wherein the first storage component is a boundary between the first data source and a second data source;
   deploying a second data ingestion system at the second data source, wherein the first data ingestion system and the second data ingestion system are cascaded, and the second data ingestion system comprises a second read plugin, a second transmission plugin and a second write plugin;
   reading the data from the boundary through the second read plugin;
   writing the data into a second transmission buffer queue through the second transmission plugin; and
   acquiring the data from the second transmission buffer queue through the second write plugin and writing the data into the second data source.

8. The device according to claim 7, wherein the reading data from the first data source through the first read plugin comprises:
   reading full data or incremental data from the first data source periodically or in real time.

9. The device according to claim 7, wherein different types of data sources correspond to different read plugins, and different types of storage components correspond to different write plugins.

10. The device according to claim 7, wherein a data ingestion system is provided with a system page, and at least one of an initiation and a stop of a data ingestion task and a modification to a task execution time point is controlled through the system page.

11. A non-transitory computer readable storage medium, storing a computer instruction, wherein the computer instruction is used to cause a computer to perform
    deploying a first data ingestion system at a first data source, the first data ingestion system comprising a first read plugin, a first transmission plugin and a first write plugin;
    reading data from the first data source through the first read plugin;
    writing the data into a first transmission buffer queue through the first transmission plugin; and
    acquiring the data from the first transmission buffer queue through the first write plugin and writing the data into a first storage component; wherein the first storage component is a boundary between the first data source and a second data source;
    deploying a second data ingestion system at the second data source, wherein the first data ingestion system and the second data ingestion system are cascaded, and the second data ingestion system comprises a second read plugin, a second transmission plugin and a second write plugin;
    reading the data from the boundary through the second read plugin;

writing the data into a second transmission buffer queue through the second transmission plugin; and acquiring the data from the second transmission buffer queue through the second write plugin and writing the data into the second data source.

12. The medium according to claim 11, wherein the reading data from the first data source through the first read plugin comprises:

reading full data or incremental data from the first data source periodically or in real time.

13. The medium according to claim 11, wherein different types of data sources correspond to different read plugins, and different types of storage components correspond to different write plugins.

14. The medium according to claim 11, wherein a data ingestion system is provided with a system page, and at least one of an initiation and a stop of a data ingestion task and a modification to a task execution time point is controlled through the system page.

\* \* \* \* \*